United States Patent
O'Donnell et al.

(10) Patent No.: US 7,981,950 B2
(45) Date of Patent: Jul. 19, 2011

(54) DISPERSANT-ENCAPSULATED PARTICULATE SOLIDS

(75) Inventors: John Patrick O'Donnell, Blackley (GB); Stephen George Yeates, Macclesfield (GB); Tom Annable, Blackley (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 1167 days.

(21) Appl. No.: 10/581,712

(22) PCT Filed: Nov. 24, 2004

(86) PCT No.: PCT/GB2004/004960
§ 371 (c)(1),
(2), (4) Date: Mar. 2, 2007

(87) PCT Pub. No.: WO2005/056700
PCT Pub. Date: Jun. 23, 2005

(65) Prior Publication Data
US 2007/0263050 A1 Nov. 15, 2007

(30) Foreign Application Priority Data

Dec. 6, 2003 (GB) .................................. 0328320.7
Dec. 10, 2003 (GB) .................................. 0328573.1
Jun. 9, 2004 (GB) .................................. 0412831.0

(51) Int. Cl.
*C08K 9/10* (2006.01)
(52) U.S. Cl. ........ 523/210; 523/205; 523/160; 523/161; 347/86; 347/100
(58) Field of Classification Search .................. 523/160, 523/161, 205, 210; 347/86, 100
See application file for complete search history.

(56) References Cited

U.S. PATENT DOCUMENTS

| | | | |
|---|---|---|---|
| 3,876,603 A | 4/1975 | Makhlouf et al. | |
| 4,230,772 A | 10/1980 | Swift et al. | 428/442 |
| 4,267,235 A | 5/1981 | Rembaum et al. | 428/407 |
| 4,678,814 A | 7/1987 | Rembaum | 522/175 |
| 5,085,698 A * | 2/1992 | Ma et al. | 524/388 |
| 5,100,969 A | 3/1992 | Yamamoto | 525/327 |
| 5,348,997 A * | 9/1994 | Kato et al. | 524/189 |
| 6,262,152 B1 * | 7/2001 | Fryd et al. | 524/90 |
| 7,008,994 B1 * | 3/2006 | Waki | 524/556 |
| 2002/0065347 A1 * | 5/2002 | Freeman et al. | 524/397 |
| 2004/0176498 A1 * | 9/2004 | Ando et al. | 523/160 |
| 2004/0242726 A1 | 12/2004 | Waki et al. | 523/160 |
| 2005/0027079 A1 * | 2/2005 | Palmer Lauer et al. | 525/244 |

FOREIGN PATENT DOCUMENTS

| | | |
|---|---|---|
| EP | 0 567 128 A1 | 10/1993 |
| EP | 0 617 097 A2 | 9/1994 |
| EP | 0 634 425 A1 | 1/1995 |
| EP | 0 778 317 A2 | 6/1997 |
| EP | 1 088 865 A | 4/2001 |
| EP | 1 505 128 | 2/2005 |
| WO | WO 03/097753 A1 | 11/2003 |

* cited by examiner

Primary Examiner — David Wu
Assistant Examiner — Vu A Nguyen
(74) Attorney, Agent, or Firm — Morgan Lewis & Bockius LLP

(57) ABSTRACT

A process for preparing a modified particulate solid comprising reacting a dispersant with a compound in the presence of a particulate solid and a liquid medium, characterised in that:
a) the dispersant has at least one reactable group selected from keto, aldehyde and beta-diketoester groups,
b) the compound has at least two groups reactive towards said keto, aldehyde and/or beta-diketoester groups.

The process provides a modified particulate solid having improved stability which is particularly useful for liquid vehicles having and range of polarities and for incorporation into ink jet printing inks.

27 Claims, No Drawings

DISPERSANT-ENCAPSULATED PARTICULATE SOLIDS

This invention relates to a process for preparing a modified particulate solid (e.g. an encapsulated particulate solid) and to the use of such modified solids in inks, especially ink jet printing inks.

Many inks, mill-bases, paints and the like require effective dispersants for uniformly distributing a particulate solid in a liquid vehicle. The liquid vehicle may vary from highly polar (e.g. water) to highly non-polar liquids (e.g. toluene). Known dispersants tend to work effectively only with liquid vehicles within a range of polarities. Outside such polarities the particulate solid typically flocculates. Thus a range of dispersants has been developed for liquid media of different polarities.

Conventional dispersants suffer from a disadvantage in that they may readily be displaced from a particulate solid surface by a more strongly absorbing material which can result in destabilisation of the dispersion and flocculation.

The problems associated with conventional dispersants can be addressed in part by modifying a particulate solid, for example by encapsulating the particulate solid within a cross-linked dispersant. The process of encapsulating a particulate solid with a cross-linkable dispersant is typically performed in a liquid medium. The cross-linkable dispersant can be mixed with a particulate solid distributed in a liquid medium, the dispersant then absorbs onto the particulate solid surface and the dispersant can then be cross-linked via its cross-linkable groups utilising a cross-linking agent to "fix" the dispersant onto the particulate solid surface. Such an approach is described in U.S. Pat. No. 6,262,152, WO 00/20520, JP 1997-10483, JP 1999-152424 and EP 732,381. We have found such encapsulation approaches suffer from deficiencies. For example in U.S. Pat. No. 6,262,152 and WO 00/20520 the cross-linking chemistry described involves the reaction between isocyanate groups in the cross-linking agent and hydroxy groups in the dispersant. Hydrophobic cross-linking agents are disclosed in U.S. Pat. No. 6,262,152 and WO 00/20520 but we have found that such cross-linking agents tend to be difficult to disperse into liquid media and result in a significant degree of flocculation and an increase in the particle size of the particulate solid. JP 1997-10483 describes an acid precipitation and redispersion process which typically utilises melamine cross-linking. JP 1997-10483 also describes harsh curing conditions of around 95° C. combined with a harsh acid catalyst needed to get the cross-linking chemistries to cure. In JP 1999-152424 a similar process of acid precipitation and redispersion is described. Here even harsher cure temperatures of around 140° C. are typically used to effect cure. We have found that these harsh temperatures and the use of harsh acid catalysts tend to flocculate the pigment dispersion.

EP 732,381 describes isocyanate cross-linking agents, amine cross-linking agents and hydroxy prepolymer dispersants as a reactive cross-linking system. The reaction typically requires a temperature of around 80° C. A solvent is needed in the dispersion process to dissolve the dispersant. The solvent is then typically removed from the final product. These thermal conditions and the presence of a solvent tend, again, to result in flocculation of the particulate solid.

According to the present invention there is provided a process for preparing a modified particulate solid comprising reacting a dispersant with a compound in the presence of a particulate solid and a liquid medium, characterised in that:
   a) the dispersant has at least one reactable group selected from keto, aldehyde and beta-diketoester groups,
   b) the compound has at least two groups reactive towards said keto, aldehyde and/or beta-diketoester groups.

Preferably the modified particulate solid is an encapsulated particulate solid.

Preferably the compound is a cross-linking agent. While not strictly necessary in all embodiments, it is preferred that the compound does in fact cross-link the dispersant. Under these circumstances the particulate solid is preferably modified by being encapsulated within the cross-linked dispersant. Thus in a preferred embodiment of the process:
   the modified particulate solid prepared by the process is an encapsulated particulate solid;
   (ii) the dispersant is a dispersant having at least one cross-linkable group selected from keto, aldehyde and beta-diketoester groups;
   (iii) the compound is a cross-linking agent having at least two cross-linking groups reactive towards said cross-linkable group(s); and
   (iv) the reaction comprises cross-linking the dispersant with the cross-linking agent, thereby encapsulating the particulate solid within the cross-linked dispersant.

Thus, a preferred process according to the present can be summarised as a process for preparing an encapsulated particulate solid comprising cross-linking a dispersant with a cross-linking agent in the presence of a particulate solid and a liquid medium, thereby encapsulating the particulate solid within the cross-linked dispersant, characterised in that:
   a) the dispersant has at least one cross-linkable group selected from keto, aldehyde and beta-diketoester groups; and
   b) the cross-linking agent has at least two cross-linking groups reactive towards said cross-linkable group(s).

The particulate solid may be any inorganic or organic particulate solid material or mixture thereof which is insoluble in the liquid medium. Preferably the particulate solid is a colorant, more preferably a pigment.

Examples of suitable particulate solids are inorganic and organic pigments, extenders, fillers for paints and plastics materials; disperse dyes and water-soluble dyes in liquid media which do not dissolve said dyes; optical brightening agents; textile auxiliaries for solvent dye-baths, inks and other solvent application system; solids for oil-based and inverse-emulsion drilling muds; particulate ceramic materials; and magnetic particles (e.g. for use in magnetic recording media), biocides; agrochemicals; and pharmaceuticals.

A preferred particulate solid is an organic pigment, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although often regarded as being inorganic, behaves more like an organic pigment in its dispersing properties and is another example of a suitable particulate solid. Preferred organic pigments are phthalocyanines, especially copper phthalocyanine pigments, azo pigments and indanthrone, anthranthrone, quinacridone and carbon black pigments.

Preferred inorganic particulate solids include: extenders and fillers, e.g. talc, kaolin, silica, barytes and chalk; particulate ceramic materials, e.g. alumina, silica, zirconia, titania, silicon nitride, boron nitride, silicon carbide, boron carbide, mixed silicon-aluminium nitrides and metal titanates; particulate magnetic materials e.g. magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof.

Where the process of the present invention is used to make modified particulate solids for use in ink jet inks the pigment is preferably a cyan, magenta, yellow or black pigment.

The liquid medium may be non-polar but is preferably polar. "Polar" liquids are generally capable of moderate to strong hydrogen bonding, e.g. as described in the article entitled "A Three Dimensional Approach to Solubility" by Crowley et al in Journal of Paint Technology, Vol. 38, 1966, at page 269. Polar liquid media generally have a hydrogen bonding number of 5 or more as defined in the abovementioned article.

Examples of suitable polar liquid media include ethers, glycols, alcohols, amides and especially water. Numerous specific examples of polar liquid media are given in the book entitled "Compatibility and Solubility" by Ibert Mellen (published in 1968 by Noyes Development Corporation) in Table 2.14 on pages 39-40, which is incorporated herein by reference thereto.

Preferred polar liquid media are alkanols, especially such liquids containing up to, and including, a total of 6 carbon atoms. As examples of the preferred polar liquid media there may be mentioned glycols and glycol esters and ethers, e.g. ethylene glycol, 2-ethoxyethanol, 3-methoxypropylpropanol, 3-ethoxypropylpropanol; alkanols, e.g. methanol, ethanol, n-propanol, isopropanol, n-butanol and isobutanol; cyclic ethers and amides, especially cyclic amides, e.g. pyrrolidone and n-methylpyrrolidone; more especially water; and combinations thereof.

The polar liquid medium is optionally a polyol, that is to say, a liquid with two or more hydroxy groups. Preferred polyols include glycerol, alpha-omega diols and especially alpha-omega diol ethoxylates.

Preferably the liquid medium comprises water as this tends to result in a particularly stable and fine modified particulate solid. Preferably the liquid medium comprises from 1 to 100%, more preferably from 10 to 100%, especially from 20 to 90% and more especially from 30 to 80% water by weight. Preferred non-polar liquid media include non-halogenated aromatic hydrocarbons (e.g. toluene and xylene); halogenated aromatic hydrocarbons (e.g. chlorobenzene, dichlorobenzene and chlorotoluene); non-halogenated aliphatic hydrocarbons (e.g. linear and branched aliphatic hydrocarbons containing six or more carbon atoms, including those which are fully and partially saturated), halogenated aliphatic hydrocarbons (e.g. dichloromethane, carbon tetrachloride, chloroform, trichloroethane); natural non-polar liquids (e.g. vegetable oil, sunflower oil, linseed oil, terpenes and fatty glycerides); and combinations thereof.

The liquid medium may comprise a mixture of liquids which may be polar or non-polar liquids. Preferably at least one component of the liquid medium is a polar liquid, more preferably all the components of the liquid medium are polar liquids.

Preferably the liquid medium is not reactive towards the dispersant or the compound. Preferably the liquid medium is not reactive towards either the compound (e.g. cross-linking agent) or the dispersant. Thus, it is preferred that the liquid medium is free from components having amine, imine, thiol, (meth)acrylate, activated olefin, hydrazide, keto, aldehyde or beta-diketoester groups. In the case of amine groups tertiary or stearically hindered amine groups may be present in the liquid medium as these are essentially non-reactive groups.

Preferably the dispersants is polymeric, e.g. a polyurethane, polyester or more preferably a polyvinyl dispersant. The dispersant may be a combination of different polymer types. The dispersant must have at least one, more preferably at least two and especially at least four reactable keto, aldehyde and/or beta-diketoester groups. The dispersant having at least two reactable groups tends to show enhanced ability to react compared to those having only one reactable group. The reactable groups are preferably cross-linkable groups. Preferably the reactable group is a beta-diketoester group as this results in particularly effective reaction and this group facilitates the use of particularly low temperatures for reaction (e.g. less than 60° C.).

The above mentioned reactable groups are preferably incorporated into the dispersant by means of copolymerizing a monomer containing at least one keto, aldehyde or beta-diketoester group. For polyvinyl dispersants the preferred monomers containing at least one keto, aldehyde or beta-diketoester group are acrolein, methyl vinyl ketone or, more preferably, acetoacetoxy ethylacrylate, acetoacetoxy propylmethacrylate, allyl acetoacetate, acetoacetoxybutyl methacrylate or 2,3-di(acetoacetoxy)propyl methacrylate or, especially preferably, acetoacetoxy ethylmethacrylate and more especially preferably diacetone acrylamide. Hence preferred polyvinyl dispersants comprise at least one residue of such monomers.

Monomers containing at least one beta-diketo ester group can be prepared by methods known in the art, for example as described in "Comparison of Methods for the Preparation of Acetoacetylated Coating Resins", Witzeman, J. S. et al Journal of Coating Technology", Vol 62, 1990, page 101 onwards which is incorporated herein by reference thereto.

Polyesters containing at least one beta-diketoester group can be prepared by reacting a polyester having one or more primary hydroxy groups with a suitable chloro, bromo or iodo-alky acetoacetatate or dieketene.

Polyurethanes containing at least one beta-diketoester group can be prepared in an analogous way to the above polyesters using one or more primary hydroxy groups in the polyurethane. Such functionalisation routes are known in the literature, for example J. Coating Technology 62, (789), 101, (1990). Alternatively, keto and aldehyde groups may readily be prepared by the reduction of a carboxylic acid or by the oxidation of an alcohol.

As described above, in a preferred embodiment of the present invention the liquid medium comprises water. It is also often desirable to prepare the dispersant and/or store the dispersant in a liquid composition comprising water.

One potential disadvantage of using a dispersant having at least one beta-diketoester reactable group is that such groups are prone to hydrolysis in water, particularly at higher temperatures and in the presence of certain bases (e.g. KOH and NaOH). This hydrolysis reaction effectively slowly cleaves the beta-diketoester reactable group(s) from the dispersant and thereby reduces the ability of the dispersant to react and modify the particulate solid according to the process of the present invention. Complete hydrolysis can result in a dispersant which cannot react to modify the particulate solid.

By way of example the hydrolysis of a dispersant having acetoacetoxy groups initially results in the production of acetoacetic acid and a hydroxyl-functional dispersant. The acetoacetic acid subsequently decomposes to yield acetone and carbon dioxide.

Thus where the dispersant has at least one beta-diketoester reactable group and the liquid medium is or comprises water it is preferred that the dispersant is reacted with the compound within 24 hours, more preferably within 12 hours and especially within 8 hours of the dispersant coming into contact with the liquid medium. It is also preferred that where a dispersant having beta-diketoester reactable group(s) is stored in the form of a composition comprising water that the storage temperature should not exceed 35° C. and/or that the composition should be free of metal hydroxides bases.

We have also found that the problem of unwanted hydrolysis of beta-diketoester reactable groups in the dispersants can be greatly reduced by protecting such groups by reversibly capping the beta-diketoester with a mono-functional amine to form a dispersant having at least one enamine/ketimine group. It will be understood by those skilled in the art that the enamine and ketimine groups are tautomers of each other. These tautomeric forms are in dynamic equilibrium with each other. When a dispersant having beta-diketoester groups is capped with a mono-functional amine the product is a mixture of dispersant molecules having on average beta-diketoester and enamine/ketimine groups wherein the enamine/ketimine groups predominate. This mixture is dynamic and beta-diketoester groups and enamine/ketimine groups are constantly interchanging.

optionally has one or more other functionalities such as, for example, hydroxyl, carboxyl or polyalkyleneoxide groups, provided that these optional groups are not reactive with the compound or the dispersant.

Preferably the mono-functional amine is a primary amine. Preferably the primary amine is an optionally substituted alkylamine, more especially an optionally substituted $C_{1-10}$-alkyl primary amine which may be linear or branched. The optional substituents are preferably selected from halogen (e.g. Cl, I, Br and F), nitrile, nitro, sulphate, phosphate, polyalkyleneoxide, carboxy, ester, amide, ether and especially hydroxy.

Preferably the primary amino group in the mono-functional amine is not sterically hindered (e.g. the mono-functional amine is not an aryl or t-butyl amine) as this hinders enamine/ketimine formation. Preferred mono-functional amines are methylamine, ethylamine, propylamine, aminomethyl propanol, iso-amylamine, isopropylamine and especially ammonia. The use of ammonia as the mono-functional amine is particularly preferred since during the modification process the ammonia can be substantially driven off as a volatile gas so as to speed the reaction and modification.

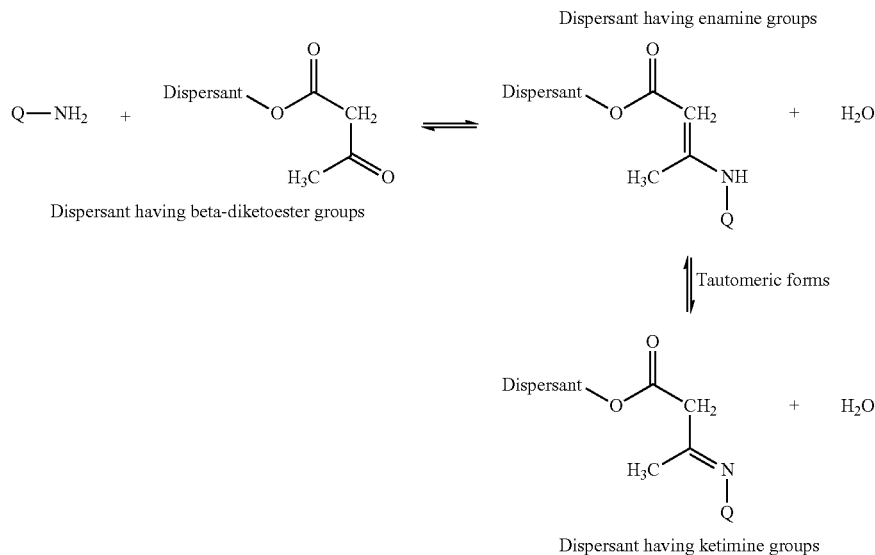

Q is the residue from the mono-functional amine

Subsequent reaction of the dispersant having beta-diketoester groups in the above equilibrium mixture with the compound pulls the equilibrium to the left (as shown above), resulting in some of the dispersant having enamine/ketimine groups being converted to a dispersant having beta-diketoester groups. This continues as the enamine/ketimine groups are converted to beta-diketoester groups and the beta-diketoester groups then react with the compound to modify the particulate solid.

In view of the above it is preferred that the liquid medium further comprises a dispersant having at least one enamine/ketimine group which is convertible to a beta-diketoester group.

Preferably the dispersant having at least one enamine/ketimine group is obtained or obtainable by reaction of a dispersant having at least one beta-diketoester group with a mono-functional amine. By the term mono-functional in relation to amine it is meant that the amine has only one amine group per molecule. However the mono-functional amine The amount of mono-functional amine used in relation to amount of beta-diketoester groups in the dispersant can vary significantly but it is preferred that the mono-functional amine is used at stoichiometric equivalence or above relative to the amount of beta-diketoester groups in the dispersant. A preferred method of adding the mono-functional amine to the dispersant having at least one beta-diketoester group is to add sufficient mono-functional amine to a composition comprising the dispersant and water so as to achieve and stabilise a pH of from 7 to 11 and especially preferably from 9 to 10.

In the case of poly vinyl dispersants, diacetone acrylamide provides reactable keto groups with good reactivity and which do not suffer from the hydrolysis reaction described above.

Preferably the monomer containing at least one keto, aldehyde or beta-diketoester group is incorporated at from 80 to 0.1 mole %, more preferably from 70 to 5 mole % and especially from 70 to 10 mole % based on all the monomers used to make the dispersant.

Preferred polymeric dispersants comprise both hydrophilic and hydrophobic monomers.

The polymeric dispersants are preferably random or alternating (having statistically short blocks or segments) but can be block or graft (having longer blocks or segments). The polymeric dispersants can be branched or star but are preferably linear. The polymeric dispersants may have two or more segments. Preferably the polymeric dispersant is a random polymer.

In embodiments where the dispersant has two or more segments it is preferred that at least one segment is hydrophobic and at least one segment is hydrophilic relative to each other. A preferred method for making hydrophilic and hydrophobic segments is by the polymerisation of hydrophilic and hydrophobic monomers respectively. Where the dispersant has at least one hydrophilic and at least one hydrophobic segment the reactable groups can be situated in a hydrophobic segment, in a hydrophilic segment or in both.

Hydrophilic monomers are those monomers comprising hydrophilic groups which may be ionic or non-ionic groups. The ionic groups may be cationic but are preferably anionic. Both cationic and anionic groups may be used to give amphoteric stabilisation.

Preferred anionic groups are phenoxy, carboxylic acid, sulphonic acid and phosphoric acid groups which may be in the free acid or salt form. Preferred salts forms are ammonium, substituted ammonium, quaternary ammonium, sodium, lithium and potassium salts.

Preferred cationic groups are substituted ammonium, quaternary ammonium, benzalkonium, guanidine, biguanidine and pyridinium. These can be in the form of a free base, a salt such as a hydroxide, sulphate, nitrate, chloride, bromide, iodide and fluoride or in the form of a quaternary ammonium salt formed with for example an alkyl halide or dimethyl sulphate.

Preferred non-ionic groups are glucosides, saccharides, pyrrolidone, acrylamide residues and especially polyethyleneoxy and hydroxy groups. The dispersant can contain a single non-ionic group, several non-ionic groups throughout the dispersant or one or more polymeric chains containing non-ionic groups. Hydroxy groups can be incorporated using polymeric chains such as polyvinylalcohol, polyhydroxyl functional acrylics and celluloses. Polyethyleneoxy groups can be incorporated using polymeric chains such as polyethyleneoxide.

Hydrophobic monomers are those monomers comprising hydrophobic groups. Preferred hydrophobic groups are predominantly hydrocarbons, fluorocarbons, poly $C_{3-4}$ alkyleneoxy and alkyl siloxanes comprising less than three and more preferably no hydrophilic groups. The hydrophobic group is preferably a $C_3$-$C_{50}$ chain which can be pendant or in chain with the hydrophobic monomer.

Polyvinyl dispersants may be made by any means known in the art. A preferred method for making polyvinyl dispersants is free radical polymerisation of vinyl monomers, especially (meth)acrylates and vinyl monomer containing aromatic groups such as vinyl naphthalene and especially styrenic monomers. Suitable free radical polymerisation methods include but are not limited to suspension, solution, dispersion and preferably emulsion polymerisation. Preferably the vinyl polymerisation is carried out in a liquid composition comprising water.

Vinyl copolymers which contain the residue of both hydrophilic and hydrophobic monomers can be made essentially without segments. Using cost effective, conventional and robust free radical polymerisation methods the segment length is often statistically very short or effectively non existent. This is the case in what are often referred to as "random" polymerisations. Thus in order to produce less preferred segment structures with longer segment lengths more exotic and more costly polymerisation methods such as living polymerisations and especially group transfer polymerisation, atom transfer polymerisation, macromonomer polymerisation, graft polymerisation and anionic or cationic polymerisation are required.

Suitable hydrophilic vinyl monomers include non-ionic and ionic monomers.

Preferred non-ionic vinyl monomers are those containing saccharide, glucoside, amide, pyrrolidone and especially hydroxy and polyethyleneoxy groups.

Preferred examples of non-ionic vinyl monomers include hydroxy ethylacrylate, hydroxy ethyl methacrylate, vinyl pyrrolidone, polyethoxylated (meth)acrylates and (meth) acrylamides.

The ionic vinyl monomer may be cationic but is preferably anionic. Preferred anionic vinyl monomers are those comprising phosphoric acid groups, sulphonic acid groups and especially carboxylic acid groups which may be in the free acid (protonated) form or salts thereof. The salts are as described hereinbefore. Preferred examples are acrylic acid, methacrylic acid, itaconic acid, β-carboxy ethyl acrylate, maleic acid, monoalkyl itaconates (for example, monomethyl maleate, monoethyl maleate, monobutyl maleate and monooctyl maleate), citraconic acid, styrenesulfonic acid, vinylbenzylsulfonic acid, vinylsulfonic acid, acryloyloxyalkyl sulfonic acids (for example, acryloyloxymethyl sulfonic acid, acryloyloxyethyl sulfonic acid, acryloyloxypropyl sulfonic acid and acryloyloxybutyl sulfonic acid), methacryloyloxymethyl sulfonic acid, methacryloyloxyethyl sulfonic acid, methacryloyloxypropyl sulfonic acid and methacryloyloxybutyl sulfonic acid), 2-acrylamido-2-alkylalkane sulfonic acids (for example, 2-acrylamido-2-methylethanesulfonic acid, 2-acrylamido-2-methylpropanesulfonic acid and 2-acrylamido-2-methylbutane sulfonic acid), 2-methacrylamido-2-alkylalkane sulfonic acids (for example, 2-methacrylamido-2-methylethanesulfonic acid, 2-methacrylamido-2-methylpropanesulfonic acid and 2-methacrylamido-2-methylbutanesulfonic acid), mono-(acryloyloxyalkyl)phosphates (for example, mono(acryloyloxyethyl) phosphate and mono(3-acryloyloxypropyl)phosphates) and mono(methacryloyloxyalkyl)phosphates (for example, mono (methacryloyloxyethyl)phosphate and mono(3-methacryloyloxypropyl)phosphate).

Especially preferred vinyl anionic monomers are acrylic acid, itaconic acid, β-carboxy ethyl acrylate, maleic acid and most especially methacrylic acid.

Preferred cationic monomers are those comprising substituted amine, quaternary amine, pyridine, guanidine and biguanidine groups. Especially preferred cationic acrylic monomers include dimethyl amino ethyl (meth)acrylate, diethyl amino ethyl (meth)acrylate, vinyl pyridine, dimethyl amino propyl methacrylamide and dimethyl amino butyl acrylate. These can be in the form of the free base (unprotonated), in the form of salt or in the form of a quaternary ammonium salt.

Preferred hydrophobic vinyl monomers have no hydrophilic groups. Preferred hydrophobic vinyl monomers include $C_{1-20}$-hydrocarbyl (meth)acrylates, butadiene, styrene and vinyl naphthalene. Especially preferred $C_{1-20}$-hydrocarbyl (meth)acrylates are butyl (meth)acrylate, octyl (meth)acrylate, 2-ethyl hexyl (meth)acrylate, isobornyl acrylate, lauryl acrylate and stearyl acrylate.

Polyesters are typically made by esterification of a dicarboxylic acid with a diol. In place of the carboxylic acid an acid chloride, anhydride or alky (typically methyl or ethyl) ester of the acid can be used. Small amounts of monofunctional and/or tri or higher functional monomers can be present. Mixtures of carboxylic acids and/or alcohols can be used. Another route to the preparation of polyesters is the reaction of cyclic lactones such a method is typical for monomers such as caprolactone. Also caprolactone polymers can be reacted to give diols which may be used in both polyester or polyurethane synthesis.

Preferred hydrophobic monomers for making polyesters are esters, acids, acid chlorides, anhydrides, cyclic lactones and alcohols containing $C_{1-50}$-hydrocarbylene more preferably $C_{4-50}$-hydrocarbylene, and especially $C_{6-20}$-hydrocarbylene residues. These can be alkylene, cycloalkylene, arylene, aralkylene, alkarylene. These preferably contain no hydrophilic groups other than those needed for the polyester polymerisation. Other preferred hydrophobic monomers include those containing poly $C_{3-4}$-alkyleneoxy (especially polypropyleneoxy), fluorocarbons and siloxanes. Hydrophobic urethanes, polycarbonates and polyvinyls can be prepared with carboxylic acid or hydroxy groups such that they may be incorporated into polyesters.

Preferred hydrophilic monomers for making polyesters contain hydroxy groups and/or acid groups which are unreacted, or ethyleneoxy.

Especially preferred are polyethyleneoxy polyols.

Suitable hydrophilic monomers for making polyesters may comprise sulphonic acid with hydroxy and/or carboxylic acid groups, for example aromatic dicarboxylic acids having an ionised sulphonate group. Particularly preferred is sodio-5-sulphoisophthalic acid (SSIPA). Other useful monomers which have two or more groups which readily undergo an ester condensation reaction and have one or more sulphonic acid groups are dihydroxy aryl monomers having at least one sulphonate group.

Since the polyester reaction is itself determined by the amounts and reactions of acids and hydroxy groups a further method of preparing hydrophilic polyesters is to use a non-stoichiometric excess of either the acid or the hydroxy group, or to use stoichiometric equivalence of these groups but not to complete the polyester synthesis to full conversion leaving some hydrophilic groups unreacted. Another method for introducing hydrophilic residues is to incorporate polyester monomers containing protected hydrophilic groups which are de-protected after polymerisation. The advantage of protection/de-protection is that the molecular weight and remaining acid/hydroxy functionality can be more separately controlled.

Polyurethanes are preferably made by the reaction of a di-isocyanate with a diol. Small amounts of monofunctional and/or tri or higher functional monomers can also be present. Mixtures of isocyanates and/or alcohols can be used.

Preferred hydrophobic monomers for making polyurethanes include isocyanates and alcohols comprising $C_{1-50}$-hydrocarbylene more preferably $C_{4-50}$-hydrocarbylene, and especially $C_{6-20}$-hydrocarbylene residues. These can be alkylene, cycloalkylene, arylene, aralkylene and alkarylene. Preferably the hydrophobic monomers contain no hydrophilic group other than those needed for the urethane polymerisation. Alternative preferred hydrophobic monomers for making polyurethanes contain siloxane and fluorocarbon groups. Hydrophobic polycarbonates, polyesters and polyvinyls can be prepared with isocyanate or hydroxy groups such that they can be incorporated into a polyurethane.

Examples of suitable hydrophobic isocyanates include ethylene diisocyanate, 1,6-hexamethylene diisocyanate, isophorone diisocyanate, tetramethylxylene diisocyanate, 1,4-phenylene diisocyanate, 2,4-toluene diisocyanate, 2,6-toluene diisocyanate, 4,4'-diphenyl-methane diisocyanate and its hydrogenated derivative, 2,4'-diphenylmethane diisocyanate and its hydrogenated derivative, and 1,5-naphthylene diisocyanate. Mixtures of the polyisocyanates can be used, particularly isomeric mixtures of the toluene diisocyanates or isomeric mixtures of the diphenylmethane diisocyanates (or their hydrogenated derivatives), and also organic polyisocyanates which have been modified by the introduction of urethane, allophanate, urea, biuret, carbodiimide, uretonimine or isocyanurate residues.

Preferred hydrophobic alcohols contain poly C-alkyleneoxy (especially polypropyleneoxy), fluorocarbon, siloxane, polycarbonate and $C_{1-20}$-hydrocarbyl poly (meth)acrylate residues.

Preferred examples of hydrophobic diols for making polyurethanes include hexane diol, cyclohexane diol, propyleneoxy diols, diols from polycaprolactone, diols from polyvalerolactone, poly$C_{1-20}$-alkyl (meth)acrylate diols, siloxane diols, fluorocarbon diols and alkoxylated bisphenol A.

Preferred hydrophilic monomers for making polyurethanes contain polyethyleneoxy, acidic groups or quaternary ammonium groups. Preferred examples of such monomers containing acidic groups are bis(2-hydroxyethyl)-5-sodiosulphoisophthalate and dihydroxy alkanoic acids, especially 2,2-dimethylol propionic acid. Preferred examples of such monomers containing quaternary ammonium groups are quaternary ammonium salt diols for example dimethanol diethyl ammonium bromide. The acidic and quaternary ammonium group may be in the form of a salt as hereinbefore described. A preferred polyurethane monomer containing an polyethyleneoxy groups is polyetheneoxide diol and especially the polyethyleneoxy amines as described in EP317258 the teaching of which is incorporated herein.

Hydrophilic residues can be introduced into polyurethanes by using excess hydroxy groups over isocyanate groups so that the resulting hydrophilic polyurethanes have unreacted hydroxy groups after polymerisation. In addition, monomers containing protected hydrophilic groups such as a carboxylic acid converted into a protected ester or a hydroxy group converted into a protected esters or silanol can also be used which are later deprotected.

The dispersant is preferably chosen to suit the liquid medium to be used in the process for preparing the modified particulate solid and optionally also a liquid vehicle to be used in the final intended composition in which the modified particulate solid will be used (e.g. in inks). Thus for example where the modified particulate solid is to be used in an aqueous ink jet ink the dispersant preferably has a predominantly hydrophilic character. Similarly where the modified particulate solid is to be used in an oil-based (non-aqueous) paint or ink the dispersant preferably has a predominantly hydrophobic character.

The acid value (AV) of the dispersant is preferably from 10 to 200, more preferably from 30 to 150 and especially from 60 to 120 mg KOH/g of the dispersant.

Preferably the dispersant has a number average molecular weight of from 500 to 100,000, more preferably from 1,000 to 50,000 and especially from 1,000 to 35,000.

The dispersant need not be totally soluble in the liquid medium. That is to say perfectly clear and non-scattering solutions are not essential. The dispersant may aggregate in surfactant-like micelles giving slightly hazy solutions in the liquid medium. Further the dispersant may be such that some proportion of the dispersant tends to form a colloidal or micellar dispersion. It is preferred that the dispersant produces uniform and stable dispersions in the liquid medium which do not settle or separate on standing.

It is preferred that the dispersant is substantially soluble in the liquid medium giving rise to clear or hazy solutions.

Preferred random polymeric dispersants tend to give clear compositions whilst less preferred polymeric dispersants with two or more segments tend to give rise to the aforementioned hazy compositions in liquid media.

The compound reacts with the dispersant so as to modify the particulate solid. The modification generally results in enhanced stability in liquid media having a variety of different polarities. The compound preferably reacts with the reactable groups in the dispersant in a manner which encapsulates the particulate solid.

The groups in the compound must be reactive towards the keto, aldehyde and/or beta-diketoester groups in the dispersant. Two types of reaction are preferred. The most preferred type of reaction is nucleophilic attack by reactive groups in the compound onto the carbon in the carbonyl group(s) in the keto, aldehyde or beta-diketoester group. Thus the preferred groups in the compound for this type of reaction are nucleophiles, preferred groups being each independently selected from amine, imine, hydrazide and thiol groups. These compounds having nucleophilic groups may be low molecular weight (especially those having a number averaged molecular weight of less than 1000) or they may be polymeric (having a number averaged molecular weight of more than 1000). Preferred low molecular weight compounds include aliphatic diamines, hydroxy functional aliphatic diamines, and hydrazides. Preferred examples of which include diethylene triamine, triethylene tetramine, hexamine diamine hydrazine and adipic acid dihydrazide. Preferred polymeric compounds having nucleophilic groups are polyamines, amine terminated polyoxyalkylene polymers (especially Jeffamines™) and especially polyimines. Preferred polyamines include polyvinylamine, polyallylamine and poly (4-amino styrene). Preferred polyimines include polypropyleneimine and especially polyethyleneimine.

The second type of reaction involves the formation of an enolate anion or carbanion (depending on the tautomeric structure) in a carbon adjacent to a ketone, aldehyde or beta-diketoester carbonyl group(s). The formation of the enolate anion or carbanion is achieved by the addition of a base to the dispersant. Enolate anion or carbanion formation with beta-diketoesters can be achieved in with far milder bases (such as hydroxides, bicarbonates and amines) than those for aldehydes and ketones (such as metal hydrides and organo alkali bases). Thus for this reaction type beta-diketoesters are much preferred. The enolate anion or carbanion from the dispersant can then be reacted with a compound having electrophilic groups. Thus the preferred reactive groups in the compound for this type of reaction are electrophiles, preferred groups being each independently selected from activated olefinic, diazonium and carbonyl-containing groups. Especially preferred activated olefinic groups are acrylate groups.

The reactive groups present in the compound may be the same or different. Preferably all the reactive groups in the compound are the same. Two or more compounds can also be used. Where more than one compound is used these may have a different number of reactive groups and/or may have different types of reactive groups.

The compound is preferably soluble in the liquid medium. We have found that soluble compounds give rise to higher stability and finer dispersions of the particulate solid.

Preferably the reaction is performed by mixing the particulate solid, the dispersant, the compound and the liquid medium. Preferably the weight ratio of the particulate solid to liquid medium is from 1:100 to 1:2.5, more preferably 1:100 to 1:3, especially 1:100 to 1:5. Preferably the weight ratio of the dispersant to the liquid medium is 1:1000 to 1:2.5, more preferably 1:100 to 1:3.3 and especially 1:100 to 1:5. Preferably the compound is present in the liquid medium at a concentration such that the molar ratio of reactive groups in the compound to the reactable groups in the dispersant is from 10:1 to 1:10, more preferably from 1:5 to 5:1 and especially from 1:2 to 1:2. This typically equates to a weight ratio of compound to liquid medium of 1:10,000 to 1:10, more preferably 1:2000 to 1:20.

Thus preferably the reaction is performed by mixing the following ingredients:
 a) the liquid medium;
 b) the particulate solid in a weight ratio of 1:100 to 1:3, more preferably 1:100 to 1:5;
 c) the dispersant in a weight ratio of 1:100 to 1:3.3, more preferably 1:100 to 1:5; and
 d) the compound in a weight ratio of 1:10000 to 1:10; more preferably 1:2000 to 1:20;
wherein all weight ratios are relative to the weight of the liquid medium.

Preferably the mixing is performed at a temperature below 60° C. Mixing may be performed by any method, e.g. mechanical agitation, stirring and so on.

Low temperatures for the reaction are preferred as this results in lower levels of flocculation and particle size growth of the particulate solid in the liquid medium. Preferably the reaction is performed at a temperature of less than 60° C., more preferably less than 40° C. and especially at less than 30° C. The lower temperature limit for reaction is determined by the freezing point of the liquid medium and the desired rate of reaction but a preferred lower limit is 0° C.

The length of time for the reaction depends to some extent on the temperature and presence or absence of a catalyst. However a preferred reaction time is from 1 to 24 hours, more preferable from 1 to 8 hours. If desired a catalyst may be added to speed up the reaction.

The particulate solid, the liquid medium and the dispersant may be mixed in any order or simultaneously. The mixture may be subjected to a mechanical treatment to reduce the particle size of the solid to a desired size, for example by ball milling, bead milling, gravel milling or by more elaborate techniques such as microfluidizing (using a Microfluidics™ machine) or using hydrodynamic cavitation (using for example the CaviPro™ device) until a dispersion is formed. The particulate solid may be treated to reduce its particle size independently or in admixture with either the liquid medium or the dispersant, the other ingredient or ingredients then being added and the mixture being agitated to provide the dispersion.

If desired the dispersion may be filtered or centrifuged to remove any poorly dispersed or oversized particulate material prior to reaction of the dispersant and compound. In particular, the process preferably comprises filtering a mixture comprising the dispersant, a particulate solid and liquid medium prior to reaction, preferably through a filter having a pore size of less than 10, more preferably less than 5 and especially less than 1 micron.

If the compound is present during mechanical treatment of the particulate solid this can result in undesirable pre-reaction of the dispersion before the particle size of the solid has been fully reduced. When the particulate solid is milled in the presence of the dispersant and the liquid medium the temperature is preferably not greater than 40° C. and especially not greater than 30° C.

The compound is preferably added to a mixture comprising the particulate solid, dispersant and liquid medium after mechanical treatment to reduce the particle size of the particulate solid. Reaction can occur whilst the compound is being added but it is more preferred that the greater part of the reaction occurs after complete addition of the compound. It is also preferred that less than 10% reaction has occurred 30 mins after the complete addition of the compound. This facilitates more uniform dispersion of the compound throughout the composition and results in more uniform reaction.

To inhibit reaction whilst the compound is being added to a mixture comprising the particulate solid, dispersant and liquid medium the compound is preferably added to said mixture at a temperature below 60° C. and especially below 30° C. Also it is preferred that where the process uses a catalyst to increase the speed of reaction this is added after the addition of the compound.

Preferably the process results in a modified particulate solid having a Z-average particle size of at most 50% greater, more preferably at most 25% greater, more especially preferably at most 15% greater than the Z-average particle size of the particulate solid prior to addition of the compound.

Preferably the modified particulate solid has a Z-average particle size of less than 300 nm, more preferably from 10 to 300 nm, because such particle sizes are particularly useful in paints, inks and especially in ink jet printing inks. Conventional particulate solids of this size are especially difficult to stabilise properly.

The Z-average particle size may be measured by any means known but a preferred method is via photo correlation spectroscopy techniques as available from Malvern™ and Coulter™.

It will be understood that the modified particulate solid prepared by the present invention is particulate both with respect to the initial solid and with respect to the resultant product. Accordingly, the present invention does not relate to processes, which react so as to form a solid, semi-solid, gel or coating.

The particulate solid resulting from the process of the present invention will preferably be present in the liquid medium as a dispersion. Preferably this dispersion is substantially uniform.

If desired the process may further comprise the step of isolating the resultant modified particulate solid from the liquid medium. This may be achieved by, for example, evaporating the liquid medium, or by precipitation or flocculation of the modified particulate solid followed by filtration.

Preferred methods of evaporation include freeze drying, spray drying and agitated drying. Preferred methods of precipitation and flocculation include the addition of metal salts and centrifugation.

The process of the present invention is capable of being performed at lower temperatures than are suitable for reactable dispersants having alternative reactable groups. This results in reduced levels of flocculation and minimal growth in particle size. In ink jet printing large particles are undesirable because they can block the tiny nozzles used in print heads. Furthermore, the ability to use low temperatures enables modification and dispersion of temperature-sensitive particulate solids, e.g. pharmaceuticals and agrochemicals.

According to a second aspect of the present invention there is provided a modified particulate solid obtainable or obtained by the process of the first aspect of the present invention.

The modified particulate solid prepared by the process of the present invention is useful in the manufacture of compositions comprising the modified particulate solid and a liquid vehicle. Preferably such compositions are inks and the particulate solid is a colorant, especially a pigment.

Thus according to a third aspect of the present invention there is provided a composition comprising a liquid vehicle and a modified particulate solid obtained or obtainable by a process according to the first aspect of the present invention.

The compositions may be prepared by diluting the product of the process, or by isolating the product of the process and mixing the isolated modified particulate solid with a liquid vehicle. It is preferable to prepare the composition by adding desired liquid vehicle components to the composition comprising the modified particulate solid and the liquid medium resulting from the process according to the first aspect of the present invention. This process, which does not isolate the modified particulate solid in a "dry state", tends to result in smaller particle size of the modified particulate solid.

The liquid vehicle may be identical to or different from the liquid medium used in the process for preparing the modified particulate solid. For clarity the liquid vehicle is the liquid or liquid mixture present in an "end use" composition such as an ink, a paint or the like. It is often desirable that the liquid vehicle comprises high proportions of water and that further liquids required to make the desired composition (e.g. an ink) are added after the process according to the first aspect of the present invention.

The liquid vehicle is preferably an organic solvent or water or a mixture thereof.

Preferably the liquid vehicle comprises water, especially when the compositions are intended for use in ink jet printing. Preferably the liquid vehicle comprises from 50 to 95%, more preferably from 60 to 95% and especially from 60 to 90% water by weight based on the total weight of the composition.

In the case of ink jet printing compositions it is preferable that the liquid vehicle comprises both water and an organic solvent, which is preferably a water-miscible organic solvent. Preferred water-miscible organic solvents for inclusion into the liquid vehicle include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; water-miscible ethers, preferably tetrahydrofuran and dioxane; diols, preferably diols having from 2 to 12 carbon atoms, for example ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone. Preferably the liquid vehicle comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol; and glycerol.

A preferred composition comprises:
a) from 0.1 to 50 parts, more preferably from 1 to 25 parts, of a modified particulate solid obtainable or obtained by a process according to the first aspect of the present invention;
b) from 50 to 99.9 parts, more preferably from 99 to 75 parts, of a liquid vehicle comprising water, an organic solvent or both water or an organic solvent;
wherein all parts are by weight, components a) and b) add to 100 parts.

The weight ratio of water to organic solvent when both are present in the liquid vehicle is preferably in the range 99:1 to 5:95, more preferably 95:5 to 60:40, especially 95:5 to 80:20.

The compositions of the present invention are particularly suitable for ink jet printer inks, especially where the particulate solid is a pigment.

In the case of ink jet printing the composition according to the third aspect of the present invention preferably has a viscosity of less than 50 mPa·s, more preferably less than 20 mPa·s and especially less than 10 mPa·s at a temperature of 25° C.

In the case of ink jet printing it is preferred that the composition according to the third aspect of the present invention preferably has a surface tension from 20 to 65 dynes/cm, more preferably from 25 to 50 dynes/cm at a temperature of 25° C.

The ink jet printing compositions of the present invention may also contain additional components conventionally used in ink jet printing inks, for example viscosity modifiers, pH buffers (e.g. 1:9 citric acid/sodium citrate) corrosion inhibitors, biocides, binders, dyes and kogation reducing additives.

According to a fourth aspect of the present invention there is provided a process for printing an image on a substrate comprising applying a composition according to the third aspect of the present invention to the substrate, preferably by means of an ink jet printer.

According to a fifth aspect of the present invention there is provided a paper, a plastic film or a textile material printed with a composition according to the third aspect of the present invention, preferably by means of an ink jet printer. Preferred papers are plain or treated papers which may have an acid, alkaline or neutral character. Examples of commercially available papers include, HP Premium Coated Paper, HP Photopaper (all available from Hewlett Packard Inc), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper, Xerox Acid Paper (available from Xerox).

The plastic film may be opaque or transparent. Transparent plastic films which are suitable for use as overhead projector slides, include for example polyesters (especially polyethylene terephthalate), polycarbonates, polyimides, polystyrenes, polyether sulphones, cellulose diacetate and cellulose triacetate films.

According to a sixth aspect of the present invention there is provided an ink jet printer cartridge comprising a chamber and a composition according to the third aspect of the present invention wherein said composition is present in the chamber.

Modified particulate solids obtainable or obtained by the process of the present invention are particularly suitable for use in surface coatings and paints which comprise a modified particulate solid, a liquid vehicle and a binder. The particulate solid is preferably a colorant or a filler. As with inks the paint can be made using the isolated modified particulate solid but it is more preferred to use the composition comprising the modified particulate solid and the liquid medium which results from the process according to the first aspect of the invention without isolating the modified particulate solid.

Thus according to an seventh aspect of the present invention there is provided a composition comprising a modified particulate colorant or filler obtainable or obtained by a process according to the first aspect of the present invention, a binder and a liquid vehicle. The binder is a polymeric material capable of binding the composition on the volatilisation of the liquid medium.

Suitable binders include natural and synthetic polymers. Preferred binders include poly(meth)acrylates, polystyrenics, polyesters, polyurethanes, alkyds, polysaccharides (e.g. cellulose) and proteins (e.g. casein). Preferably the binder is present in the composition at more than 100%, more preferably 200%, especially 300% and most preferably more than 400% based on the weight of the particulate solid.

The invention is further illustrated by the following Examples in which all parts and percentages are by weight unless otherwise stated.

EXAMPLE 1

Modified Cyan Pigment

Preparation of Dispersant (1)

A monomer feed composition was prepared by mixing methacrylic acid (25.82 parts), acetoacetoxyethylmethacrylate (128.54 parts), 2-ethylhexylmethacrylate (45.64 parts) and isopropanol (100 parts). An initiator feed composition was prepared by mixing 2,2' azobis(2-methylbutyronitrile) (7.25 parts) and isopropanol (50 parts).

Isopropanol (50 parts) was heated to reflux in a reactor vessel, continuously stirred and purged with a nitrogen gas atmosphere. The monomer feed and the initiator feed compositions were slowly fed into the reactor vessel whilst stirring the contents, heating to reflux and maintaining a nitrogen atmosphere. The monomer feed was fed into the reactor over 2 hours and the initiator feed was fed in over 3 hours. Reflux heating of the reactor vessel contents was continued for a further hour after complete addition of the initiator feed before cooling to 25° C. The product obtained was an acrylic polymer solution with a solids content of 49.6% by weight. The solvent and unreacted monomers were removed from the acrylic polymer solution by evaporation at reduced pressure to give a solid acrylic polymer of number average molecular weight 14,188, weight average molecular weight 39,386 and polydispersity 2.7 as measured by GPC. This is Dispersant (1).

Dispersant Solution 1

Dispersant (1) (15 parts) was dissolved in water (85 parts) and neutralised with potassium hydroxide aqueous solution to give an aqueous solution of pH 8.1. This is Dispersant Solution (1).

Mill-Base (1)

A particulate solid (C.I. Pigment Blue 15:3, 120 parts, ex Clariant) was mixed with Dispersant Solution (1) (80 parts) and deionised water (588 parts). The mixture was milled in an Eiger mill for a period of 3 hours. This resulted in a mill-base comprising a particulate solid of Z-average particle size 136 nm and a pigment content of 15% by weight. This is Mill-base (1).

Reaction of Dispersant (1) to Modify a Particulate Solid

A reactive compound (Diethylene triamine, 0.077 parts) was slowly added to Mill-base (1) (50 parts) and the mixture was stirred for 6 hours at a temperature of 40 to 50° C. The resultant modified particulate solid had a Z-average particle size of 161 nm which had increased in size by only 18%. This is Modified Particulate Solid (1).

EXAMPLE 2

Modified Yellow Pigment

Mill-Base (2)

A particulate solid (C.I. Pigment Yellow 74, 60 parts, ex Clariant) was mixed with Dispersant Solution (1) (340 parts). The mixture was milled in a Blackley mill for a period of 6 hours. This resulted in a mill-base comprising a particulate solid of Z-average particle size 110 nm and a pigment content of 15% by weight. This is Mill-base (2).

Reaction of Dispersant (1) to Modify a Particulate Solid

A reactive compound (Adipic dihydrazide, 0.229 parts) was slowly added to Mill-base (2) (50 parts) and the mixture was stirred for 6 hours at a temperature of 40 to 50° C. The resultant modified particulate solid had a Z-average particle size of 116 nm which had increased in size by only 5%. This is Modified Particulate Solid (2).

EXAMPLE 3

Modified Cyan Coloured Pigment

Preparation of Dispersant (2)

A monomer feed composition was prepared by mixing methacrylic acid (129 parts), methyl methacrylate (75 parts), diacetone acrylamide (190.5 parts), 2-ethylhexylmethacrylate (355.5 parts) and isopropanol (375 parts). An initiator feed composition was prepared by mixing 2,2'-azobis(2-methylbutyronitrile) (22.05 parts) and isopropanol (187.5 parts).

Isopropanol (187.5 parts) was heated to 80° C. in a reactor vessel, continuously stirred and purged with a nitrogen gas atmosphere. The monomer feed and the initiator feed compositions were slowly fed into the reactor vessel whilst stirring the contents, maintaining the temperature at 80° C. and maintaining the nitrogen atmosphere. The monomer feed and the initiator feed were fed into the reactor vessel over 2 hours. The reactor vessel contents were maintained at 80° C. for a further 4 hours after complete addition of the initiator and monomer feeds. The reactor contents were then cooled to 25° C. The product obtained was an acrylic polymer solution with a solids content of 49.6% by weight. The acrylic polymer was isolated from the isopropanol and any unreacted monomers by rotary evaporation under reduced pressure. The resultant acrylic polymer had a number average molecular weight 11,037, weight average molecular weight 29,339 and polydispersity 2.7 as measured by GPC. This is Dispersant (2).

Dispersant Solution (2)

Dispersant (2) (150 parts) was dissolved in water (470 parts) and neutralised with potassium hydroxide aqueous solution to give an aqueous solution of pH 7.7. This is Dispersant Solution (2).

Mill-Base (3): Modified Cyan Pigment

A particulate solid (C. I. Pigment Blue 15:3, 60 parts, ex Clariant) was mixed with Dispersant Solution (2) (340 parts). The mixture was milled in a Blackley mill for a period of 3 hours. This resulted in a mill-base comprising a particulate solid of Z-average particle size 145 nm and a pigment content of 15% by weight. This is Mill-base (3).

Reaction of Dispersant (2) to Modify a Particulate Solid

A reactive compound (Adipic dihydrazide, 0.229 parts) was slowly added to Mill-base (3) (50 parts) and the mixture was stirred for 6 hours at a temperature of 40 to 50° C. The resultant modified particulate solid had a Z-average particle size of 151 nm which had increased in size by only 4%. This is Modified Particulate Solid (3).

EXAMPLE 4

Modified Magenta Pigment

Mill-Base (4)

A particulate solid (C.I. Pigment Red 122, 60 parts, ex. Sun) was mixed with Dispersant Solution (2) (340 parts). The mixture was milled in a Blackley mill for a period of 11 hours. This resulted in a mill-base comprising a particulate solid of Z-average particle size 143 nm and a pigment content of 15% by weight. This is Mill-base (4).

Reaction of Dispersant (2) to Modify a Particulate Solid

A reactive compound (Adipic dihydrazide, 0.686 parts) was slowly added to Mill-base (4) (50 parts) and the mixture was stirred for 6 hours at a temperature of 40 to 50° C. The resultant modified particulate solid had a Z-average particle size of 148 nm which had increased in size by only 3%. This is Modified Particulate Solid (4).

COMPARATIVE EXAMPLE 1

NCO/OH Cross-Linkinq

Preparation of Comparative Dispersant (1)

A monomer charge mixture comprising methacrylic acid (12.04 parts), methyl methacrylate (20 parts), hydroxyethylmethacrylate (36.4 parts), 2-ethylhexylmethacrylate (31.73 parts) and methylethylketone (200 parts) was charged to a stirred reactor, purged with nitrogen and heated to reflux at 80° C. An initiator charge mixture was prepared by mixing 2,2'-azobis(2-methylbutyronitrile) (35 parts) and methylethylketone (187.5 parts). The initiator charge mixture was then charged to the reactor.

A monomer feed was prepared by mixing methacrylic acid (48.16 parts), methyl methacrylate (80 parts), hydroxyethylmethacrylate (145.6 parts) and 2-ethylhexylmethacrylate (126.9 parts). An initiator feed was prepared by mixing 2,2'-azobis(2-methylbutyronitrile) (10 parts) and methylethylketone (65 parts). The monomer feed and the initiator feed were fed into the reactor whilst maintaining reflux, continuously stirring and under a nitrogen atmosphere. The initiator feed was fed into the reactor over 5 hours, the monomer feed was fed over 4 hours. Following completion of the initiator feed, the reactor contents were maintained at reflux for a further 30 minutes. The reactor and its contents were then cooled to 25° C. Methylethylketone (188.39 parts) was added to the reactor to adjust the final solids to 56.32%. The resultant acrylic polymer was isolated from the methylethylketone and any unreacted monomers by rotary evaporation under reduced pressure. The acrylic polymer had a number average molecular weight 9,600, weight average molecular weight 18,359 and polydispersity 1.9 as measured by GPC. This is Comparative Dispersant (1).

Comparative Dispersant Solution (1)

Dispersant (1) (39.6 parts), water (292.4 parts) and aminopropanol (7.98 parts) were mixed together and the dispersant was allowed to dissolve. This is Comparative Dispersant solution (1).

Comparative Mill-Base (1)

A particulate solid (C.I. Pigment Blue 15:3, 60 parts, ex Clariant) was mixed with Comparative Dispersant Solution (1). The mixture was milled in a Blackley mill for a period of 3 hours. This resulted in a mill-base comprising a particulate solid of Z-average particle size 139 nm and a pigment content of 15% by weight. This is Comparative Mill-base (1).

Reaction of Comparative Dispersant (1) to Modify a Particulate Solid

A reactive compound (meta-tetramethyl xylylene diisocyanate TMXDI, 1.755 parts supplied by Aldrich) was slowly added to a stirred mixture of Comparative Mill-base (1) (50 parts) and dibutyltindilaurate (0.1 parts) and the mixture stirred for a further 6 hours at a temperature of 40 to 50° C. The resultant modified particulate solid had a Z-average particle size of 176 nm which had increased in size by 27%. This is Comparative Modified Particulate Solid (1).

Growth in Particle Size During Modification of the Particulate Solid

TABLE 1

| Example | % Growth |
| --- | --- |
| Example 1 | 18% |
| Example 2 | 5% |
| Example 3 | 4% |
| Example 4 | 3% |
| Comparative example 1 | 27% |

Table 1 shows the growth in Z-average particle size from the particle size of the mill-base to the particle size of the corresponding modified particulate solid. The particle size growth which results from reacting a dispersant with a medium insoluble diisocyanate compound is significantly larger than that seen with the process of the present invention, especially where the process of the present invention uses a compound which is soluble in the liquid medium. Growth in particle size during reaction is particularly undesirable where the modified particulate solid is to be used in an ink jet ink because aggregated particles can block ink jet nozzles and lead to reduced operability and print performance. A significant growth in particle size (above for example 25%) may require additional process steps (e.g. micro filtration) to remove aggregated material from the modified particulate solid so that it is more suitable for use in an ink jet ink. This adds technical complexity and is wasteful of the modified product.

Tests
Thermal Stability

Samples of Mill Bases (1 to 4 and comparative mill-base 1) and Modified Particulate Solids (1 to 4 and comparative modified particulate solid) were stored at a temperature of 60° C. for duration of 2 weeks. After this time the Z-average particle size was remeasured and the percentage growth was calculated. Table 2 summaries the results.

TABLE 2

| Mill-base | % Growth | Modified particulate solid | % Growth |
| --- | --- | --- | --- |
| 1 | 22.4 | 1 | 9.9 |
| 2 | 10.0 | 2 | 0 |
| 3 | 7.0 | 3 | 1.3 |
| 4 | 6.9 | 4 | 0 |

Table 2 shows that the compositions resulting from the process of the present invention show superior thermal stability to unmodified equivalent mill-bases.

Solvent Resistance

The resistance of Mill-bases (1 to 4 and comparative mill-base 1) and Modified Particulate Solids (1 to 4 and the comparative modified particulate solid) to organic liquids was measured by adding them to butoxy ethanol/water mixtures. Table 3 shows the maximum amount of butoxy ethanol in percent by weight where the dispersion is still visibly stable and does not visibly aggregate or flocculate.

TABLE 3

|  | 1 | 2 | 3 | 4 | Comparative 1 |
| --- | --- | --- | --- | --- | --- |
| Mill-base | 10% | 10% | <10% | 10% | 10% |
| Modified particulate solid | 100% | 50% | 100% | 50% | 50% |

Higher percentages represent a greater stability and greater tolerance to butoxy ethanol.

It can be seen that the solvent resistances were much improved for the modified particulate solid as compared to the corresponding mill-bases and the comparative modified particulate solid.

Ink jet ink compositions were prepared by mixing the components in each column of Table 4.

TABLE 4

| | Ink Formulation | | | | | |
| --- | --- | --- | --- | --- | --- | --- |
| | 1 | 2 | 3 | 4 | 5 | 6 |
| Modified Pigment Solid 3 | 20 | | | | | |
| Modified Pigment Solid 4 | | 20 | | | | |
| Modified Pigment Solid 2 | | | 20 | | | |
| Mill-base 3 | | | | 20 | | |
| Mill-base 4 | | | | | 20 | |
| Mill-base 2 | | | | | | 20 |
| 2-Pyrollidone | 2 | 2 | 2 | 2 | 2 | 2 |
| 1,5 Pentane Diol | 5 | 5 | 5 | 5 | 5 | 5 |
| Glycerol | 10 | 10 | 10 | 10 | 10 | 10 |
| Tegowet ™ 510 | 0.5 | 0.5 | 0.5 | 0.5 | 0.5 | 0.5 |
| Water | 64 | 64 | 64 | 64 | 64 | 64 |

Tegowet ™ 510 is a wetting agent available from Tego.

Ink Jet Ink Stability Testing

The Z-average particle size and the viscosity of inks 1 to 6 were measured directly after mixing and following storage for 2 weeks at a temperature of 60° C. Inks 1 to 3, comprising modified particulate solids showed no viscosity increase and less than 5% growth in Z-average particle size following storage. Inks 4 to 6, comprising mill-bases, showed a significant and visible thickening and a growth in Z-averaged particle size of at least 50%. Thus the modified particulate solids resulting from the process of the present invention showed greater stability in ink jet ink compositions than did the conventional mill-bases.

The invention claimed is:

1. A process for preparing an encapsulated particulate solid comprising cross-linking a dispersant with a cross-linking agent in the presence of a particulate solid and a liquid medium, thereby encapsulating the particulate solid within the cross-linked dispersant characterised in that:
   a) the dispersant has at least one cross-linkable group selected from keto, aldehyde and beta-diketoester groups,
   b) the cross-linking agent has at least two groups reactive towards said cross-linkable groups;

wherein the cross-linking reaction is performed by mixing the following ingredients:
i) the liquid medium;
ii) the particulate solid in a weight ratio of 1:100 to 1:3;
iii) the dispersant in a weight ratio of 1:100 to 1:3.3; and
iv) the cross-linking agent in a weight ratio of 1:10000 to 1:10;
wherein all weight ratios are relative to the weight of the liquid medium.

2. A process according to claim 1 wherein the cross-linking agent is soluble in the liquid medium.

3. A process according to claim 1 wherein the cross-linking agent has at least two cross-linking groups reactive towards said cross-linkable group(s) and the cross-linking groups are nucleophiles.

4. A process according to claim 3 wherein the cross-linking groups are each independently selected from amine, imine, hydrazide and thiol groups.

5. A process according to claim 1 wherein the cross-linking agent has at least two cross-linking groups reactive towards said cross-linkable group(s) and the cross-linking groups are electrophiles.

6. A process according to claim 5 wherein the cross-linking groups are each independently selected from activated olefinic, diazonium and carbonyl-containing groups.

7. A process according to claim 1 wherein the dispersant is polymeric.

8. A process according to claim 1 wherein the dispersant is a polyvinyl dispersant.

9. A process according to claim 8 wherein the polyvinyl dispersant comprises at least one monomer residue selected from acrolein, methyl vinyl ketone, acetoacetoxy ethylacrylate, acetoacetoxy propyl methacrylate, allyl acetoacetate, acetoacetoxybutyl methacrylate, 2,3-di(acetoacetoxy)propyl methacrylate, acetoacetoxy ethylmethacrylate and diacetone acrylamide.

10. A process according to claim 9 wherein the polyvinyl dispersant comprises at least one monomer residue from diacetone acrylamide.

11. A process according to claim 1 wherein the dispersant has at least one beta-diketoester cross-linkable group.

12. A process according to claim 11 wherein the liquid medium further comprises a dispersant having at least one enamine/ketimine group which is convertible to a beta-diketoester group.

13. A process according to claim 12 wherein the dispersant having at least one enamine/ketimine group is obtained by reaction of a dispersant having at least one beta-diketoester group with a mono-functional amine.

14. A process according to claim 13 wherein the mono-functional amine is ammonia.

15. A process according to claim 1 wherein the cross-linking is performed at a temperature of less than 60° C.

16. A process according to claim 1 wherein the encapsulated particulate solid has a Z-average particle size of at most 50% greater than the Z-average particle size of the particulate solid prior to addition of the cross-linking agent.

17. A process according to claim 1 wherein the liquid medium comprises water.

18. A process according to claim 1 comprising the further step of isolating a resultant encapsulated particulate solid from the liquid medium.

19. An encapsulated modified particulate solid obtained by a process according to claim 1.

20. A composition comprising a liquid vehicle and an encapsulated particulate solid according to claim 19.

21. A composition according to claim 20 having a viscosity of less than 20 mPa·s at 25° C.

22. A composition according to claim 21 wherein the liquid vehicle comprises water and an organic solvent in a weight ratio of 99:1 to 5:95.

23. A process for printing an image on a substrate comprising applying a composition according to claim 20 to the substrate.

24. A process according to claim 23 wherein the printing is performed by means of an ink jet printer.

25. A paper, a plastic film or a textile material printed with a composition according to claim 20.

26. An ink jet printer cartridge comprising a chamber and a composition wherein the composition is present in the chamber and the composition is as claimed in claim 20.

27. A composition according to claim 20 where the particulate solid is a colorant or filler and the composition further comprises a binder.

* * * * *